US011823260B2

(12) United States Patent
Walters et al.

(10) Patent No.: US 11,823,260 B2
(45) Date of Patent: Nov. 21, 2023

(54) METHODS AND SYSTEMS FOR ORDER-SENSITIVE COMPUTATIONS IN LOAN ACCOUNTING

(71) Applicant: SCRATCH PLATFORM, LLC, San Francisco, CA (US)

(72) Inventors: Christopher Walters, San Francisco, CA (US); Victoria Zi Gong, San Francisco, CA (US)

(73) Assignee: SCRATCH PLATFORM, LLC, San Francisco, CA (US)

( * ) Notice: Subject to any disclaimer, the term of this patent is extended or adjusted under 35 U.S.C. 154(b) by 0 days.

(21) Appl. No.: 17/068,607

(22) PCT Filed: Apr. 2, 2019

(86) PCT No.: PCT/US2019/025428
§ 371 (c)(1),
(2) Date: Oct. 12, 2020

(87) PCT Pub. No.: WO2019/195321
PCT Pub. Date: Oct. 10, 2019

(65) Prior Publication Data
US 2021/0366037 A1  Nov. 25, 2021

Related U.S. Application Data

(60) Provisional application No. 62/652,232, filed on Apr. 3, 2018.

(51) Int. Cl.
*G06Q 40/03* (2023.01)
*G06Q 40/12* (2023.01)

(52) U.S. Cl.
CPC .............. *G06Q 40/03* (2023.01); *G06Q 40/12* (2013.12)

(58) Field of Classification Search
CPC ...... G06Q 40/00; G06Q 40/025; G06Q 40/12; G06Q 40/03
(Continued)

(56) References Cited

U.S. PATENT DOCUMENTS

| 8,620,782 | B2 * | 12/2013 | Kight | G06Q 20/027 |
| | | | | 705/34 |
| 8,818,887 | B2 * | 8/2014 | Ahlers | G06Q 20/20 |
| | | | | 705/35 |
| 2002/0152155 | A1 * | 10/2002 | Greenwood | G06Q 40/025 |
| | | | | 705/38 |

(Continued)

FOREIGN PATENT DOCUMENTS

| CN | 109858715 A | * | 6/2019 |
| JP | 2001283128 A | * | 10/2001 |

(Continued)

OTHER PUBLICATIONS

Tripathy, Abhishek "TPM based Virtual Monotonic Counters and Count-Limited Objects without a Trusted OS*" Jul.-Aug. 2013, International Journal of Emerging Trends & Technology in Computer Science (IJETTCS) vol. 2, Issue 4 (Year: 2013).*

(Continued)

*Primary Examiner* — Kelly S. Campen
(74) *Attorney, Agent, or Firm* — MORRISON & FOERSTER LLP

(57) ABSTRACT

A computer-implemented method for regulating a loan managed by a loan accounting system that includes steps of: detecting a new action affecting a logical history of a loan managed by the loan accounting system, with the new action representing a new event in a loan process of the loan; identifying a first series of events related to the logical history of the loan affected by the new action; automatically calculating states of the loan based on a plurality of actions each associated with an event of the first series of events, wherein at least two of the actions have a causal relationship with one another; and automatically recalculating and updat- (Continued)

ing a physical history of the loan based on the calculated states of the loan with the physical history including a second series of events that is different than the first series of events.

15 Claims, 6 Drawing Sheets

(58) Field of Classification Search
 USPC .......................................... 705/35, 38, 36 R
 See application file for complete search history.

(56) References Cited

U.S. PATENT DOCUMENTS

| | | | | |
|---|---|---|---|---|
| 2007/0265957 A1* | 11/2007 | Advani | ................. | G06Q 40/03 |
| | | | | 705/38 |
| 2007/0265960 A1* | 11/2007 | Advani | ................ | G06Q 40/025 |
| | | | | 705/38 |
| 2011/0302076 A1* | 12/2011 | Livermore | ............ | G06Q 40/02 |
| | | | | 705/38 |
| 2015/0003299 A1* | 1/2015 | Li | ....................... | H04L 12/1475 |
| | | | | 370/259 |
| 2016/0241676 A1 | 8/2016 | Armstrong et al. | | |
| 2017/0255996 A1 | 9/2017 | Gil et al. | | |
| 2017/0329660 A1 | 11/2017 | Salunke et al. | | |
| 2019/0043034 A1* | 2/2019 | McKendrick | .......... | G06Q 20/22 |

FOREIGN PATENT DOCUMENTS

| | | | | |
|---|---|---|---|---|
| KR | 20120075518 A | * | 7/2012 | |
| WO | WO-2007019451 A2 | * | 2/2007 | ........... G06Q 20/204 |

OTHER PUBLICATIONS

The above US Publications were cited in the Jul. 1, 2019 International Search Report of PCT/US2019/0195321, a copy of which is enclosed.

* cited by examiner

METHODS AND SYSTEMS FOR ORDER-SENSITIVE COMPUTATIONS IN LOAN ACCOUNTING

CROSS-REFERENCE

This application claims priority to U.S. Provisional Application No. 62/652,232 filed on Apr. 3, 2018, which is entirely incorporated herein by reference.

BACKGROUND

Loan accounting calculations may be order sensitive. In the example of payments and interest accrual, payments may decrease a principal balance of a loan (subtraction operation) while interest may accrue as a percentage of the principal balance (multiplication operation), and a change in the order of payments or order of application of payments may result in different amount of interest accrual. Since these operations do not commute with one another, they can be sensitive to the order of computation. There are several critical issues in current loan accounting systems due to the coupled or interrelated series of events in a loan.

In a first scenario, because any update to a state of a loan, such as repayment status (usually categorical), may be order sensitive, speculative updates may be considered but may fail at a later time. For example, when a payment is received, the system needs to credit the loan correctly, allocating the payment across principal, interest, fees, and the like according to the state of the loan at the time the payment is credited and the applicable rules. Such credit may be speculative, because that payment, if made through a finance transaction network (e.g., Automated Clearing House (ACH) network), can be reversed within a period of time (e.g., 60 days). In the case when a reversal is issued, there may be a cascade of causally-relevant changes.

For example, since the principal balance was reduced, the interest accrued on the loan after the now-reversed payment is now understood to be artificially low, and all accruals need to be adjusted upwards. In another example, views of cash- and accrual-basis accounting may need to be corrected and reported to the creditor. If there were intermediate payments between the original payment and its reversal, their allocations across principal, interest, fees, and the like must be re-calculated. If the reversed payment had previously satisfied a particular installment and no other payment can be reallocated to do so, a late fee may now be required and the borrower may be delinquent. If servicing fees were calculated as a function of the unpaid balance, such fees need to be adjusted, and any invoiced and transmitted funds need to be moved accordingly. If money was transmitted to the creditor or transferred into one or more accounts held for the benefit of creditors, the treasury management consequences need to be accounted for. If an intermediate due date change was initiated, there may be changes to the expected amortization schedules that are relevant to communicate to the borrowers or creditors; or if the loan is eligible for certain benefits (e.g., those available under the Servicemembers Civil Relief Act (SCRA)), there may be caps on interest and fees that become relevant in the new situation that were not relevant when the payment was considered valid. Such events and the related consequences may be coupled and interact with the others through their dependence and influence on the loan's state, such as the loan's principal and interest balances or repayment status, at any point in time. In such a case, a change in the original speculation (crediting the original payment) happens, an arbitrary series of the interacting or coupled consequences, including new consequences such as late fees and returned check fees, need to be reconsidered for calculating the loan's state. The original payment event may cause effects at the moment in time it was made and materialized (i.e., having point-like causal influence). There is an interval of causal influences that has to be considered when materializing the payment reversal (i.e., having interval-like causal influence) that spans the moment the original payment was made through the moment the payment reversal was initiated. For example, if an incorrect decision was made resulting in the failure of a previous speculation (e.g., a bug was detected or a policy changed), the system must correctly account for reversing the reversal, including accounting for changes that have occurred since the initial reversal. In principle, this recursion is bounded only by the set of events already handled by the system. In another example, in the course of effecting the consequences of a failed speculation, a subset of updates that were originally computed must remain intact despite the fact that the new history would have otherwise computed them differently if the failed speculation had failed at its origin instead of later. For instance, in generation of periodic statements for borrowers, regardless of whether events happened after a statement is generated for an installment period, including operations like toggling autopay with a discount whose projected impact would impact the balance due, the reported due amount may need to be respected as originally rendered for purposes of assessing whether that installment was satisfied.

In a second scenario, conventional loan accounting systems may have flaws due to overlapping intervals of causal influence. In some cases, several events may have intervals of causal influence (multiple side-effects spread over an interval of time) that overlap, and the side-effects thereof may interact with each other. For example, some loan terms offer an interest rate discount if the borrower enables autopay which is allowed if the loan is not delinquent. Enabling it at any time point in the middle of an installment period has the effect of applying the lower rate for the entire installment period since the beginning of the installment period. Since the effects of this toggle autopay event span the interval from the beginning of the installment period to the moment it was submitted, it has a retroactive causal interval, just as the payment reversal event described above does. In an example set up as below, at t1: installment period ends and the next installment period begins, payment P1 is submitted and satisfies the previous installment's amount due, allocating appropriately to interest and principal, P1 has a point-like causal influence at materialization at t1; at t2: interest accrual event IA1 accrues interest on the principal at the original rate, $r_{original}$, IA1 has point-like causal influence at materialization at t2; at t3: autopay begins with event AP, which is allowed because the installment was satisfied by P1 (AP has an interval-like causal influence at materialization on (t1, t3]). Due to the causality intervals of AP and PR overlapping and containing non-trivial interactions, the system needs to account for IA1's now-incorrect accrual using $r_{original}$ and instead replace it with $r_{discounted}$. At t4: interest accrual event IA2 accrues interest at the newly-discounted rate, $r_{discounted}$ (IA2 has a point-like causal influence at materialization at t4); and at t5: payment reversal PR occurs, which reverses P1 (PR has an interval-like causal influence at materialization on [t1, t5]). In the above example, P1 has a point-like causal influence at materialization at t1; IA1 has point-like causal influence at materialization at t2; IA2 has a point-like causal influence at materialization at t4; and PR has an interval-like causal influence at materialization on [t1, t5]. Due to the causality intervals of AP and PR overlapping and containing non-trivial interactions, the system needs to account for IA1's now-incorrect accrual using $r_{original}$ and instead replace it with $r_{discounted}$, and account for IA1, AP and IA2 having accrued on the wrong principal balance as well as the complicated interaction with autopay, which first modified the effective accrual rate from $r_{orginal}$ to $r_{discounted}$ but due to PR causing the installment to become unsatisfied, the rate modification and subsequent re-accruals must be reversed as well. For instance, assuming AP is invalid, AP's initial retroactive side-effects need to be retroactively undone by PR. In another example, had a second payment P2, been made before AP (perhaps intended as a prepayment to pay down principal only), it is possible that the re-allocation of a second payment during materialization of PR may cause the installment to be satisfied anyway, meaning AP would remain valid despite P1's reversal and its rate-modifying side-effects should remain intact.

The overlapping intervals may also cause cascading retroactive updates. This may happen when the interval initially targeted for re-calculation overlaps with another interval that logically begins before it. For instance, in the example as described above, since PR's causal interval overlaps AP's causal interval, PR has an effective causal interval of (t1,t5], because AP has to be reconsidered in light of the new event.

In a third scenario, existing loan accounting systems may have drawbacks particularly when updates are sometimes delivered later or at an arbitrary time than the logical time in which they have causal influence. This may happen both for application-specific reasons (e.g., SCRA notification arrives months after the service member has begun active duty and is thus entitled to benefits) as well as for technical operations reasons (e.g., fault-tolerance). In some cases, problems may arise when events are considered out-of-order and occur across the boundary of a loan's lifetime. For instance, an Event such as an autopay toggle may happen, and later the creditor may elect to write the loan off before the toggle occurred but be delayed in notifying or reporting to others. Since the autopay toggle logically happened after the write off, it may be invalidated, and any impact it had to interest accrual, payment allocation, and the like may be removed so the creditor can accurately report the accounting and tax consequences. Other problems may arise when the original boundary condition is falsified by a new Event. For example, when a loan's balance becomes $0, the loan is typically considered paid off. However, some loans include the possibility for the borrower to obtain future disbursements that are unknown at the time of origination. Thus, they can't be incorporated at the start due to the lack of capability of handling dynamic boundary conditions.

Existing financial accounting system may solve the problem by exhaustively examining all the possible scenarios resulting in a less efficient system. Moreover, in some cases, there can be an unbounded number of potential combinations and orderings of overlapping and interacting events that a loan accounting system has to consider during the calculation.

SUMMARY

The present disclosure provides financial (e.g., loans, leases, or other credit products) accounting systems that can address various drawbacks of conventional systems, including those recognized above. A financial accounting system of the present disclosure is advantageously able to accommodate events or compositions of events with point-like or interval-like consequences across any time range (past, present, or future), respect path dependence, provide a fully auditable record of updates, which is tamper-proof, accommodate reversals and corrections (i.e., rewind and replay mechanism), tolerate downtime of sub-system or subset of any data or improved scalability. Systems disclosed herein are capable of handling order-sensitive computations in various contexts, including loan accounting. In particular, the provided system may employ a high-level programming model that decouples correctly interleaving the consequences of intervening events from the representation of the loan accounting-specific business logic. Systems and methods disclosed herein may be capable of handling arbitrary and complicated interactions/events automatically with little or no human intervention. Methods and systems of the present disclosure may be used in various applications, such as, for example, loans, leases, or other credit products.

A financial accounting system of the present disclosure may employ a model that is configured to decouple reasoning with respect to various complexities of loan accounting from the implementation of loan accounting-specific business logic. Such system may be automated to minimize or require reduced work from an application developer. The system may be implemented in a distributed computing environment, such as over the cloud.

The disclosed financial (e.g., loan) accounting systems may provide various non-limiting technical benefits over conventional systems. A loan accounting system of the present disclosure may have capabilities such as: (i) being adapted for new features and future compliance regimes without a need of significant or even any change to the existing infrastructure; (ii) reducing incidental complexity in the implementation of the loan accounting-specific application logic; (iii) providing a complete, tamper-proof, append-only audit log, especially for complicated updates (e.g., payment reversals and trial modifications); (iv) providing formal basis for correctness; or (v) providing efficient storage and computation of necessary data structures. With no loss of generality, a non-crashed process may be considered as "correct."

The loan accounting system may comprise a data storage and computation layer which provides a general purpose, state machine implementation configured to provide a "rewind and replay" mechanism, and may enable a fully auditable record of updates.

The present disclosure also provides a method that may divide a time evolution of a loan into a calculation workspace that comprises possible forward evolution of a state of a loan, and a physical history log which contains series of updates actually materialized for a loan. The calculation workspace may comprise a tree structure. The calculation workspace may be used for deriving the appropriate updates to insert into the physical history of a loan by traversing the calculation workspace tree structure upon new events. The calculation workspace tree structure may provide a relationship (e.g., a constraint) to the new events. In some cases, the calculation workspace may utilize the same data structures that store the physical history. Such physical history may have a physical history log that may be append-only. The physical history log may record updates that happened in various scenarios, such as updates induced by reversing speculative events.

In an aspect, the present disclosure provides a computer-implemented method for regulating a loan managed by a loan accounting system. The method may comprise: detecting an action affecting a logical history of a loan managed by the loan accounting system, and identifying a first series of events related to the logical history. Next, states of the loan may be calculated based on a plurality of actions each associated with an event of the first series of events. At least two of the actions may have a causal relationship with one another. A physical history of the loan may then be updated based on the calculated states. The physical history may comprise a second series of events that is different than the first series of events.

Another aspect of the present disclosure provides a non-transitory computer readable medium comprising machine executable code that, upon execution by one or more computer processors, implements any of the methods above or elsewhere herein.

Another aspect of the present disclosure provides a system comprising one or more computer processors and computer memory coupled thereto. The computer memory comprises machine executable code that, upon execution by the one or more computer processors, implements any of the methods above or elsewhere herein.

In some embodiments, the action is stored in a data structure comprising a physical time, a logical time and information related to an associated event. In some cases, the associated event is stored in a data structure comprising a physical time and an event type. In some embodiments, the operation in (b) further comprises identifying the first series of events based on a mapping relationship between a given event of the first series of events and a given action of the plurality of actions.

In some embodiments, the first series of events are identified using a rewind algorithm. In some embodiments, an action of the plurality of actions has a logical order relationship with another action of the plurality of actions. In some embodiments, the logical history models events of the loan in a tree structure. In some embodiments, the states of the loan are calculated using a replay algorithm.

Additional aspects and advantages of the present disclosure will become readily apparent to those skilled in this art from the following detailed description, wherein only illustrative embodiments of the present disclosure are shown and described. As will be realized, the present disclosure is capable of other and different embodiments, and its several details are capable of modifications in various obvious respects, all without departing from the disclosure. Accordingly, the drawings and descriptions are to be regarded as illustrative in nature, and not as restrictive.

INCORPORATION BY REFERENCE

All publications, patents, and patent applications mentioned in this specification are herein incorporated by reference to the same extent as if each individual publication, patent, or patent application was specifically and individually indicated to be incorporated by reference.

BRIEF DESCRIPTION OF THE DRAWINGS

The novel features of the invention are set forth with particularity in the appended claims. A better understanding of the features and advantages of the present invention will be obtained by reference to the following detailed description that sets forth illustrative embodiments, in which the principles of the invention are utilized, and the accompanying drawings (also "figure" and "FIG." herein) of which:

DETAILED DESCRIPTION

While various embodiments of the invention have been shown and described herein, it will be obvious to those skilled in the art that such embodiments are provided by way of example only. Numerous variations, changes, and substitutions may occur to those skilled in the art without departing from the invention. It should be understood that various alternatives to the embodiments of the invention described herein may be employed.

The term "physical history," as used herein, generally refers to a series of updates along as ordered according to when they were physically observed by the system.

The term "logical history," as used herein, generally refers to a series of updates along logical time, which is a coordinate that captures updates ordered in a manner that they should have occurred given certain rules or criteria (e.g., predictive rules or criteria).

The present disclosure provides systems and methods for order-sensitive computation in various contexts, including loan accounting. The systems and methods may implement a rewind and replay mechanism to facilitate such computation. Various aspects of the present disclosure may be applied to any of the particular applications set forth below or for any other types of applications or systems. Systems or methods of the present disclosure may be employed in a standalone manner, or as part of a package.

Financial Accounting Systems

The present disclosure provides systems for financial accounting. Such systems may be employed for use in various financial contexts, including loan accounting.

Figure 1:
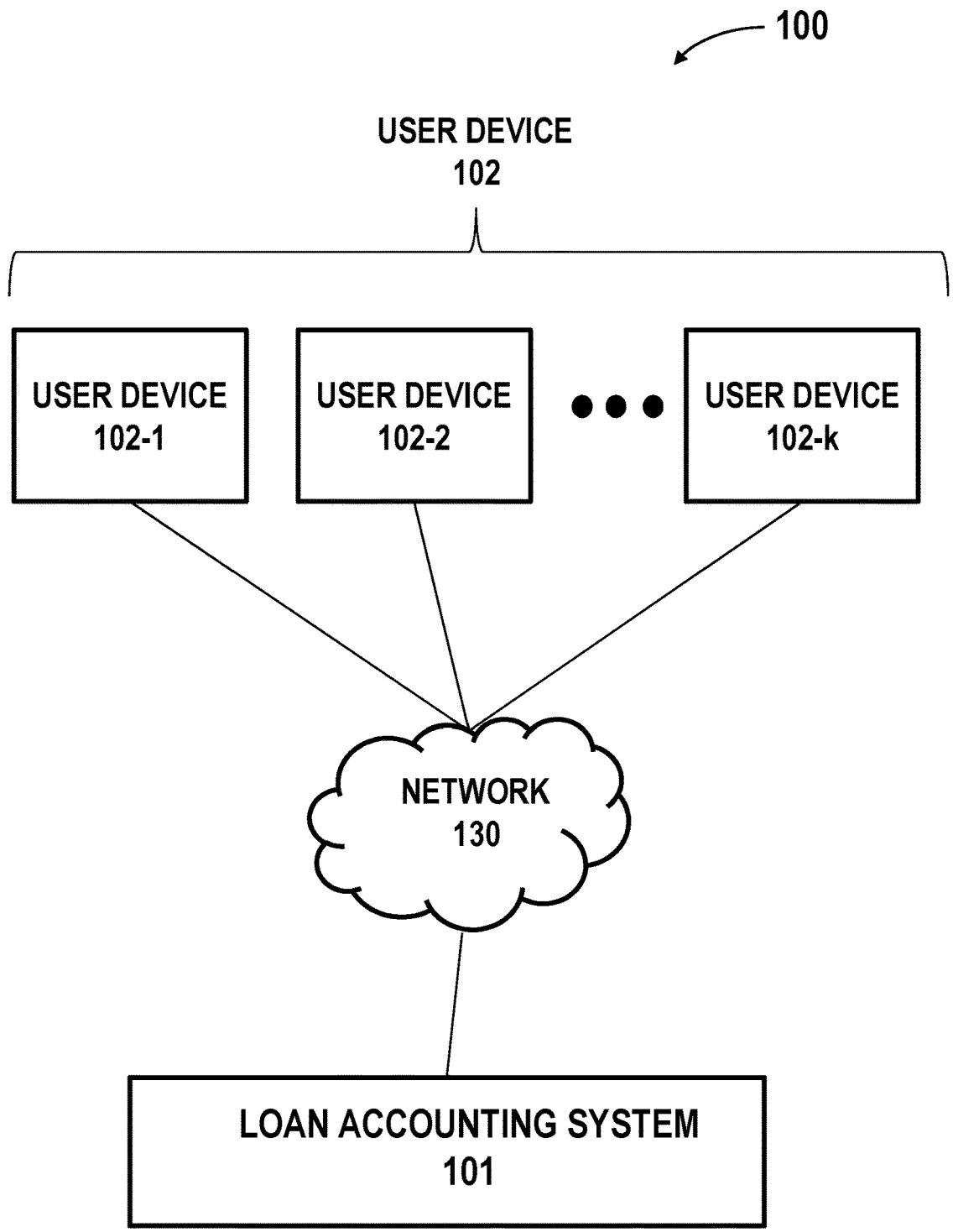
FIG. 1 illustrates an environment in which loan accounting system of the present disclosure may operate.

FIG. 1 illustrates an environment 100 in which the loan accounting system 101 described herein may operate. The loan accounting system 101 may interact with one or more user devices 102, through one or more communication networks 130. The loan accounting system and one or more components of the loan accounting system can be applied to various other financial accounting systems.

In some embodiments, the loan accounting system 101 may be configured to provide and manage a general data storage and computational layer for loan accounting. The data storage layer may include a model of computation which corresponds to a state machine specialized for loan accounting. The state machine may be reversible. The architecture of the data storage layer and its various objects are described later herein.

The loan accounting system may comprise servers and database systems, which may be configured for collecting or retrieving relevant loan information. Relevant loan information may include the user's personal information and credit information, loan type, loan amount and other various loan terms. Each of the components (e.g., servers, database systems, user devices, and the like) may be operatively connected to one another via network 130 or any type of communication links that allows transmission of data from one component to another. For instance, the servers and database systems may be in communication-via the network 130 with the user devices 102 to obtain relevant user data and/or the user's credit information, for example.

A server may include a web server, an enterprise server, or any other type of computer server, and can be computer programmed to accept requests (e.g., HTTP, or other protocols that can initiate data transmission) from a computing device (e.g., user device and/or wearable device) and to serve the computing device with requested data. In addition, a server can be a broadcasting facility, such as free-to-air, cable, satellite, and other broadcasting facility, for distributing data. A server may also be a server in a data network (e.g., a cloud computing network).

A server may include various computing components, such as one or more processors, one or more memory devices storing software instructions executed by the processor(s), and data. A server can have one or more processors and at least one memory for storing program instructions. The processor(s) can be a single or multiple microprocessors, field programmable gate arrays (FPGAs), or digital signal processors (DSPs) capable of executing particular sets of instructions. Computer-readable instructions can be stored on a tangible non-transitory computer-readable medium, such as a flexible disk, a hard disk, a CD-ROM (compact disk-read only memory), and MO (magneto-optical), a DVD-ROM (digital versatile disk-read only memory), a DVD RAM (digital versatile disk-random access memory), or a semiconductor memory. Alternatively, the methods can be implemented in hardware components or combinations of hardware and software such as, for example, ASICs, special purpose computers, or general purpose computers.

The one or more databases may utilize any suitable database techniques. For instance, structured query language (SQL) or "NoSQL" database may be utilized for storing collected device data, health plans and generated analytics. Some of the databases may be implemented using various standard data-structures, such as an array, hash, (linked) list, struct, structured text file (e.g., XML), table, JSON, NOSQL and/or the like. Such data-structures may be stored in memory and/or in (structured) files. In an example, a loan may be stored as a document and a loan's state may be modeled as logically and physically versioned fields in the document. In another alternative, an object-oriented database may be used. Object databases can include a number of object collections that are grouped and/or linked together by common attributes; they may be related to other object collections by some common attributes. Object-oriented databases perform similarly to relational databases with the exception that objects are not just pieces of data but may have other types of functionality encapsulated within a given object. If the database of the present invention is implemented as a data-structure, the use of the database of the present invention may be integrated into another component such as the component of the present invention. Also, the database may be implemented as a mix of data structures, objects, and relational structures. Databases may be consolidated and/or distributed in variations through standard data processing techniques. Portions of databases, e.g., tables, may be exported and/or imported and thus decentralized and/or integrated.

In some embodiments, the loan accounting system may construct the database in order to deliver the data to the users efficiently. For example, the loan accounting system may provide customized algorithms to extract, transform, and load (ETL) the data. In some embodiments, the loan accounting system may construct the databases using proprietary database architecture or data structures to provide an efficient database model that is adapted to large scale databases, is easily scalable, is efficient in query and data retrieval, or has reduced memory requirements in comparison to using other data structures. At least one of the databases may comprise an event store and/or an action store. Details regarding data structures for storing events and actions data types are described later herein.

The loan accounting system may be implemented anywhere in the network. The loan accounting system may be implemented on one or more servers in the network, in one or more databases in the network, or one or more user devices. The loan accounting system may be implemented using software, hardware, or a combination of software and hardware in one or more of the above-mentioned components within the loan accounting system.

User device 102, such as a user device 102-1, user devices 102-2, and a user devices 102-$k$, may be a computing device configured to perform one or more operations consistent with the disclosed embodiments. Examples of user devices may include, but are not limited to, mobile devices, smartphones/cellphones, tablets, personal digital assistants (PDAs), laptop or notebook computers, desktop computers, media content players, television sets, video gaming station/system, virtual reality systems, augmented reality systems, microphones, or any electronic device configured to enable the user to receive or post the user's loan related information, and display other information as it relates to the user's loans or creditworthiness, for example. The user device may be a handheld object. The user device may be portable. The user device may be carried by a human user. In some cases, the user device may be located remotely from a human user, and the user can control the user device using wireless and/or wired communications.

The user device may include a communication unit, which may permit the communications with one or more other components in the network. In some instances, the communication unit may include a single communication module, or multiple communication modules. In some instances, the user device may be capable of interacting with one or more components in the network environment using a single communication link or multiple different types of communication links. The user devices 102 may interact with the loan accounting system by requesting and obtaining the aforementioned data via the network 130.

User device may include one or more processors that are capable of executing non-transitory computer readable media that may provide instructions for one or more operations consistent with the disclosed embodiments. The user device may include one or more memory storage devices comprising non-transitory computer readable media including code, logic, or instructions for performing the one or more operations.

In some embodiments, users may utilize the user devices 102 to interact with the loan accounting system 101 by way of one or more software applications (i.e., client software) running on and/or accessed by the user devices, wherein the user devices 102 and the loan accounting system may form a client-server relationship. For example, the user devices 102 may run dedicated mobile applications associated with the loan accounting system and/or utilize one or more browser applications to access loan related information on the loan accounting system. In turn, the loan accounting system may deliver information and content to the user devices 102 related to loan or the user, for example, by way of one or more web pages or pages/views of a mobile application.

In some embodiments, the client software (i.e., software applications installed on the user devices 102) may be available as downloadable mobile applications for various types of mobile devices. Alternatively, the client software can be implemented in a combination of one or more programming languages and markup languages for execution by various web browsers. For example, the client software can be executed in web browsers that support JavaScript and HTML rendering, such as Chrome, Mozilla Firefox, Internet Explorer, Safari, and any other compatible web browsers. The various embodiments of client software applications may be compiled for various devices, across multiple platforms, and may be optimized for their respective native platforms.

User device may include a display. The display may be a screen. The display may or may not be a touchscreen. The display may be a light-emitting diode (LED) screen, OLED screen, liquid crystal display (LCD) screen, plasma screen, or any other type of screen. The display may be configured to show a user interface (UI) or a graphical user interface (GUI) rendered through an application (e.g., via an application programming interface (API) executed on the user device). The GUI may show graphical elements that permit a user to view or access information related to loan or the user. In some cases, the GUI may display granular and/or aggregate views of the physical history or logical history in response to a user request. The GUI can also display other features such as statements, payment history, and reports.

The user device may also be configured to display webpages and/or websites on the Internet. One or more of the webpages/websites may be hosted by a server in the network or the loan accounting system.

User devices may be associated with one or more users. In some embodiments, a user may be associated with a unique user device. Alternatively, a user may be associated with a plurality of user devices. A user as described herein may refer to an individual or a group of individuals who are seeking loan information provided by the loan accounting system.

The network 130 may be a communication pathway between the loan accounting system 101, the user devices 102, and other components of the network. The network 130 may comprise any combination of local area and/or wide area networks using both wireless and/or wired communication systems. For example, the network 130 may include the Internet, as well as mobile telephone networks. In one embodiment, the network 130 uses standard communications technologies and/or protocols. Hence, the network 130 may include links using technologies such as Ethernet, 802.11, worldwide interoperability for microwave access (WiMAX), 2G/3G/4G or Long Term Evolution (LTE) mobile communications protocols, Infra-Red (IR) communication technologies, and/or Wi-Fi, and may be wireless, wired, asynchronous transfer mode (ATM), InfiniBand, PCI Express Advanced Switching, or a combination thereof. Other networking protocols used on the network 130 can include multiprotocol label switching (MPLS), the transmission control protocol/Internet protocol (TCP/IP), the User Datagram Protocol (UDP), the hypertext transport protocol (HTTP), the simple mail transfer protocol (SMTP), the file transfer protocol (FTP), and the like. The data exchanged over the network can be represented using technologies and/or formats including image data in binary form (e.g., Portable Networks Graphics (PNG)), the hypertext markup language (HTML), the extensible markup language (XML), etc. In addition, all or some of links can be encrypted using conventional encryption technologies such as secure sockets layers (SSL), transport layer security (TLS), Internet Protocol security (IPsec), etc. In another embodiment, the entities on the network can use custom and/or dedicated data communications technologies instead of, or in addition to, the ones described above. The network may be wireless, wired, or a combination thereof.

Events

Events can generally refer to a record of a change or new input in a loan process. For example, an Event may correspond to a payment received by the user (e.g., "user made a payment of $100") or may correspond to when the user's payment (of a loan) was returned. Overall, Events can be generated or created by the platform or as a result of a user interaction. In some embodiments, the events may also be marked according to their source. Events may generally refer to a record of any change in the system. For example, events can be generated by the system or as a result of a user interaction (e.g., user devices 102 interacting with the loan accounting system 101).

Physical Time and Logical Time

The loan accounting system may involve tracking the concepts of logical time and physical time (or insertion time) (e.g., for "Events"). "Logical time" may be the time an event "should have been observed" for the purposes of reasoning about causality and ordering in calculations, wherein the calculations may refer to loan related calculations. "Physical time" may refer to the actual time (e.g., of a physical clock) or something that can be actually observed in the real world. The distinction between logical time and physical time may be important, because "events" can be processed in a different order than they were submitted to the loan accounting system.

An update or event may be tracked based on a physical time and/or the order in which events occur. An update may proceed monotonically through physical time to guarantee system-level correctness and auditability. A physical history may be a complete transaction log. For example, the physical history may enter a row entry per computation step for auditability. A physical history log may contain a series of updates materialized for a loan. The physical history log may be concrete and append-only. The physical history log may record updates that happened in various scenarios such as updates induced by reversing speculative events. A physical history can be a complete, ordered, step-wise history of updates to the loan's state, including those removed and those induced by reversing failed speculative events or other instances during rewind and replay. In some cases, updates such as events removed from logical history during rewind and replay may be appended, rather than removed from the physical history, so that they remain recoverable in the physical history for domain-specific applications (statement generation, pool reporting, etc), auditing, tamper-proof, debugging or other purposes.

At each point of physical time there may be a single logical history. A logical history may be a component of a loan accounting workspace. The workspace may also be referred to as calculation workspace which is interchangeably used throughout this description. The workspace may track events by way of summarized transaction log. For instance, the workspace may have a row entry per event for statement and payment history. For example, in a slice of the physical time, loan computations are performed for each event, and the logical history is updated, or in the slice of physical time, non-monotonic updates can be performed, enabling automatic reversibility and application-level correctness.

Data Structures

The loan accounting system may utilize data structures based on general purpose conflict-free replicated data type (CRDT). Order-sensitive computations (i.e., requiring sequential consistency guarantees) may be computable out-of-order via such data structures. A CRDT may satisfy conditions allowing any replica to accept updates without remote synchronization under eventual consistency, guaranteed to converge in a self-stabilizing manner, and despite any number of failures. Eventual consistency indicates that replicas will eventually reach the same final value if clients stop submitting updates.

Physical and/or logical histories as described herein may store data objects in state-based style or operation-based (op-based) style. In the state-based object model, executing an update modifies the state of a single replica. Every replica occasionally sends its local state to some other replica, which merges the state thus received into its own state. In this way, every update eventually reaches every replica, either directly or indirectly. A join semilattice (or just semilattice hereafter) is a partial order ≤equipped with a least upper bound (LUB) t for all pairs. The definition of join semillattice is as below: let (S,≤) be an ordered set. Suppose that for all a,b∈S: a∧b∈S. where a∧b is the join of a and b with respect to ≤. Then the ordered structure (S,∧,≤) is called a join semilattice. In the lattice of closed subsets of a topological space, the join is the closure of the union. In the lattice of subgroups of a group, the join of a collection of subgroups is the subgroup generated by their union. The lattice of order ideals of an ordered set is somewhat exceptional in this regard, because the union of a collection of order ideals is already an order ideal. In the op-based data style, an op-based object has no merge method; instead an update is split into a pair (t, u), where t is a side-effect-free prepare-update method and u is an effect-update method. The prepare-update executes at the single replica where the operation is invoked (its source). At the source, prepare-update method t is followed immediately by effect-update method. The effect-update method executes at all replicas (said downstream). The source replica delivers the effect-update to downstream replicas using a communication protocol specified by the delivery relation. In some embodiments, the system may be op-based. For instance at a higher level, operations are represented as Events that are replicated around for fault-tolerance and auditability, and are incorporated into the logical and physical histories via a consistent commit mechanism that excludes potentially conflicting updates via the rewind and replay mechanism. This provides a system meeting the critical property of commutativity since the system is isomorphic to sorting (e.g., sorting the updates according to the HAPPENS-BEFORE relation). In some embodiments, the system may comprise a state-based mechanism whereby the merge operator may rewind to the maximum (max) logical time of the common physical history prefix of Events and then replay the union of the remaining Events. This merge operator may be a commutative operator.

Happens-Before Relation

The order-sensitive computation model as provided herein may also use a "happens-before" relation. The happens-before relation may ensure correctness of order-sensitive computations (i.e., guarantees sequential consistency).

The happens-before relation may be defined as below: assuming events of a process from a sequence, where event a occurs before event b in this sequence if a happens before b. In other words, a "happens before" b may mean that it is possible for event a to causally affect event b. Two events are concurrent if neither can causally affect the other. In the provided loan accounting system, the happens-before relation may comprise parameters related to logical time and physical time. In some embodiments, the happens-before relation may comprise the logical time of an action, the physical time of the event, and the precedence of the action (e.g., type of the action).

Figure 2:
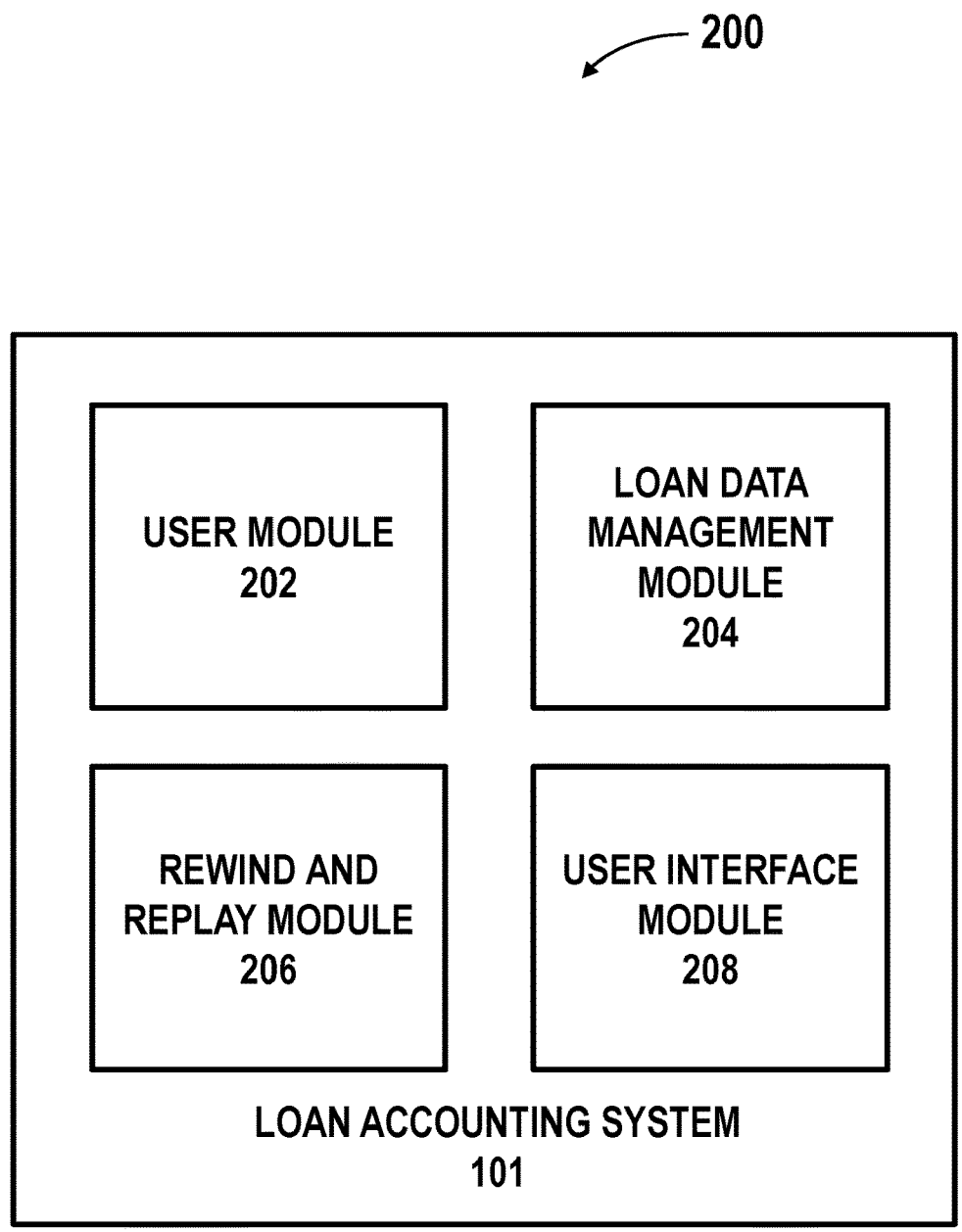
FIG. 2 illustrates components of the loan accounting system, according to some embodiments of the present disclosure.

FIG. 2 illustrates components of the loan accounting system 101, according to an embodiment described herein. The loan accounting system may comprise various components for performing the processes and features described herein. For example, in the illustrated embodiment, the loan accounting system may comprise a user module 202, loan data management module 204, a rewind and replay module 206, and a user interface module 208, in communication with each other using any suitable communication protocols.

These components of the loan accounting system are generally functional components that can generate useful data or other output using specific input(s). The components can be implemented as general or specific-purpose hardware, software, firmware (or any combination thereof) components. A component may or may not be self-contained. Depending upon implementation-specific or other considerations, the components may be centralized or distributed functionally or physically. Although a particular number of components are shown in FIG. 2, the loan accounting system can include more components or can combine the components into fewer components (such as a single component), as may be desirable for a particular implementation. One or more of the components can be implemented by a user device. The interactions among these components are illustrated in detail below.

Each component of the loan accounting system may be implemented using one or more computing devices (e.g., server devices) including at least one processor executing instructions that cause the loan accounting system to perform the processes described herein. The various components of the loan accounting system listed above can be implemented by a single server device or across multiple server devices, as described above.

The user module 202 may be configured to manage user accounts and their associated information. The user module 202 may provide forms for setting up or creating individual accounts containing information about the users. User accounts may comprise a user profile, which can be used to the store basic data or information on the user. User profile may include information on the user's name, address, and the like. The user profile may also include financial information associated with the user such as, for example, user's loan terms and account information.

The loan data management module 204 may be configured to manage data as it relates to the data storage and computation layer of the loan accounting system. The loan data management module 204 may be configured to interact with third-party platforms or systems to obtain information or data on the user's loans. For example, the loan data management module 204 may interact with a loan originating platforms to obtain information on the loan amount and the various loan terms, and information related to the disbursement of the loans and the like.

The loan data management module 204 may be configured to manage the organization and operation of the data storage layer and the computation layer of the loan accounting system. For example, the loan management module 204 may be configured to implement distributed computation using a state machine composed of reversible, pure (deterministic, side-effect-free) functions. The state machine described herein may guarantee idempotent, linearizable updates to one or more data stores associated with the loan accounting system.

The loan data management module may be configured to manage an event store and an action store. Updates to a loan may occur through events and actions as described above. The loan data management module may be capable of efficiently accessing, querying and updating logical and physical histories. The event store and action store may be configured to store data objects including at least a logical time or a physical time.

Events and actions may be stored using customized data structures such that events and actions can be queried or retrieved with improved efficiency. Events may include and/or track a physical time, which records the moment an event was created or inserted into the loan accounting system. In some instances, the physical time at which an event was created or generated may represent the logical time the event should be considered effective. In other instances, the physical time at which an event was created or generated may differ from the logical time (in the case of point-like causal influence) or interval of logical time (in the case of interval-like causal influence). Additionally or alternatively, Events may include a logical time component, which identifies when the Event should have happened, for the purposes of a given calculation. Each Event may be transformed into an Entry, and each Entry translates into an individual update. An Entry may include information on its physical time (i.e., insertion time) and/or logical time, and may represent an update. An append-only log of these updates may be kept for auditing and for reversing computations. In an example, an event may be stored in a data structure comprising: a type (e.g., LoanPaymentSubmitted), a physical time, an optional logical time, an optional set of Event IDs corresponding to the reversals of the events, and optional parameters related to the event's type (e.g., loan ID, payment amount, etc).

Actions may contain information necessary to effect a state change. In some cases, Events may represent certain Actions during their execution. Actions may be logically ordered. Actions may be logically ordered based on logical time. For example, actions may be ordered based on the "happens-before" relation. An action may have a unique, totally-ordered location according to the happens-before relation. According to the happens-before relation as described above, actions at the same logical time (i.e., concurrent events) may not causally affect one another. In an example, an action may be stored in a data structure comprising: a type (e.g., CreditLoan), a parent event (e.g., event ID), a physical time and a logical time. A given event, current state, and the accepted history may be mapped to actions that contain all information to effect the desired state change. The given event may be referred to as the parent event of the mapped actions. Such data structures allow the events and actions queried or retrieved with low-latency. For instance, events and actions can be retrieved or accessed by loan ID and logical time.

System disclosed herein may utilize a tree structure, such as a directed acyclic graph (DAG), to represent the variables such as history of events. In some cases, the system may include an acceptable histories tree (e.g., infinite DAG) that defines all causally-valid, logical evolutions of a loan's history of events according to the loan accounting state machine. Each edge of the acceptable histories tree may be a causally-valid, non-reversal event given the previously accepted events on its path. Reversals may be represented as a backtracking to the reversed event's parent by the rewind algorithm and then branching without the parent in the replay phase, if causally-valid. For example, when reversing a payment event, the process may branch to an "interest accrual" event but not a "season payment" event that refers to the reversed payment. Each acyclic path from the root to a vertex may represent a valid logical history of the loan state machine. Each path from the root to any vertex, including cycles (such as the example 301 shown in FIG. 3), can represent a valid physical history of the loan state machine. Each vertex can be the state machine's non-path-dependent state after processing the events on the path in the order from the root to the events. In some cases, as a function of the traversal path (physical history) as opposed to the path from the root (logical history), path-dependent state is necessarily separate and captured by a higher-order tree.

Method and system disclosed herein may divide a time evolution of a loan into a calculation workspace which comprises possible forward evolution of a loan's state, and a physical history log which contains series of updates actually materialized for a loan. The calculation workspace may comprise a tree structure that is used to derive the appropriate updates to insert into the loan's physical history by traversing it appropriately upon new events. In some cases, the calculation workspace can be derived from the same data structures that store the physical history (i.e., acceptable histories tree). The calculation workspace may employ a calculation workspace tree structure that can be a directed acyclic graph (DAG) derived from the acceptable histories tree. The calculation workspace tree may define the step-wise updates from accepting each new event into the loan's history thereby incorporating its side-effects into the state machine's state. For example, for each edge in the corresponding path in the acceptable histories tree, each lowest-level update (as encoded by actions that are deterministically materialized) that comprises the transition and its resulting state are modeled as a linear chain of intermediate edges and vertices in the calculation workspace tree.

Figure 4:
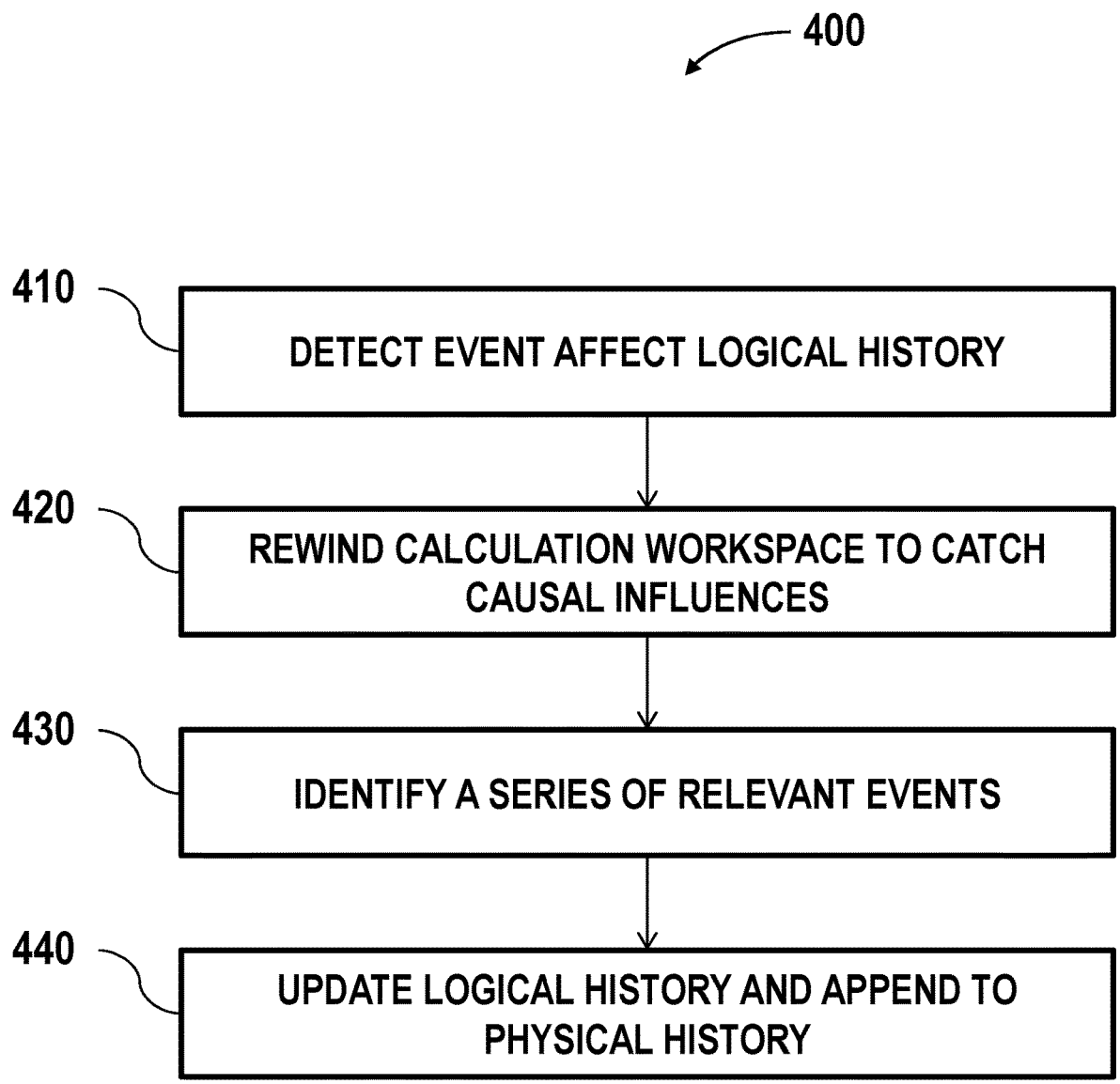
FIG. 4 illustrates an example method of rewind and replay for the loan accounting system, according to some embodiments of the present disclosure.

The rewind and replay module 206 may be configured to implement the methods described in FIG. 4. The rewind and replay module 206 may be configured to simulate any ordering or reversal of "events" by, for example, rewinding a history (e.g., log of events) back to a specific point in time, and then replaying the updated history. The specific operation of the rewind and replay module 206 may be further illustrated in FIG. 4.

The rewind and replay module 206 may have a rewind and replay mechanism. The rewind and replay mechanism may be based on a rewind and replay algorithm. The rewind and replay algorithm may address: (1) implementing the reversal and path-dependence semantics; (2) defining a HAPPENS-BEFORE relation and logical clock that ensures sequential correctness for all updates, including arbitrary overlapping causal intervals; and (3) handling out-of-order executions (updates to historical values) by implementing a join operator such that they converge to the sequentially correct execution. In some cases, the rewind and replay algorithm may function similarly to a general purpose CRDT that calculates arbitrary order-sensitive computations in arbitrary order. For instance, some or all of the operations may be pure functions that are deterministic or side-effect-free, general purpose inverse operator may be provided natively, and physical and logical time are represented explicitly in the data model while implicitly in the application logic. The rewind and replay mechanism may beneficially provide a reversible, deterministic state machine with an event-sourced framework built on top, where the state machine may automatically navigate between parallel legal logical histories and minimize the cognitive overhead of accommodating path-dependence.

The rewind algorithm is capable of handling cascading retroactive updates due to overlapping causality ranges with another range of actions. The rewind algorithm may be implemented as interactively rewind or storing and union intervals. The replay algorithm can be implemented in a naïve manner where the algorithm may have a quadratic time complexity. Alternatively, the replay algorithm may be optimized to run in linear time.

In some cases, upon receiving an input to the system that effects "the past", whether due to application semantics (e.g., a payment reversal) or operational semantics (e.g., out-of-order delivery), the system may rewind the loan's history of updates by using a natively-provided, general purpose inverse operator (e.g., rewind algorithm) to the latest point in time that guarantees that all possible causal influences are reversed. Having rewound the loan's state to the history prefix that has no causal dependence on the inputs under consideration, the algorithm may then replay all causally-relevant inputs through deterministic transformers (e.g., EventHandlers) in the correct sequential order, automatically accounting for recursive reversals, interleaving overlapping and interacting causal intervals, and handling path-dependent state.

EventHandlers can be pure functions which are deterministic and side-effect-free, and may map Event, the current state machine state S, and history of accepted Events to zero or more Actions, each of which is treated as a candidate for acceptance into the state machine's history, which updates S once accepted and materialized. In an example, each instance of an EventHandler can be parameterized with an Event and may be modeled as a process that produces a well-ordered set of Actions according to the well-order relation:

($A_{logical\_time}$, PRECEDENCE($A_{type}$), $A_{physical\_time}$),

Where PRECEDENCE($A_{type}$) is a function that maps an Action's type to a number, which is one of the interfaces between the domain-specific application logic and the domain-general causality. $A_{physical\_time}$ is a strictly monotonic clock with respect to the EventHandler's execution.

During a rewind phase, the system may perform a traversal toward the root (loan origination) from the vertices in the acceptable histories tree and the calculation workspace tree that correspond to the loan's current accepted history of Events and the corresponding state. The rewind process may proceed one edge (Action) at a time in the calculation workspace tree using the aforementioned general purpose inverse operator. The rewind process may terminate when all edges (Actions) in the calculation workspace tree that correspond to a single edge (Event) in the acceptable histories tree have been traversed.

In some cases, a step can be modeled as a pop operation on the logical history for both actions and events. The pop operation can be materialized as an appended operation that indicates the most proximate edge and vertex (event, action, and resulting state) are to be ignored when the logical history is requested (e.g., by EventHandlers). This allows for materializing non-monotonic updates (e.g., updates of the logical past) supported by monotonic updates.

As an example, in the aforementioned second scenario, upon receiving the input "PR", the system may undo the effects of P using the rewind algorithm, which causes the system to transitively undo AP and IA due to the overlapping causality intervals. Next, the system may apply the replay algorithm, removing P from the set of considerations due to PR and reconsidering IA and AP in order to determine the loan's corrected state.

Figure 3:
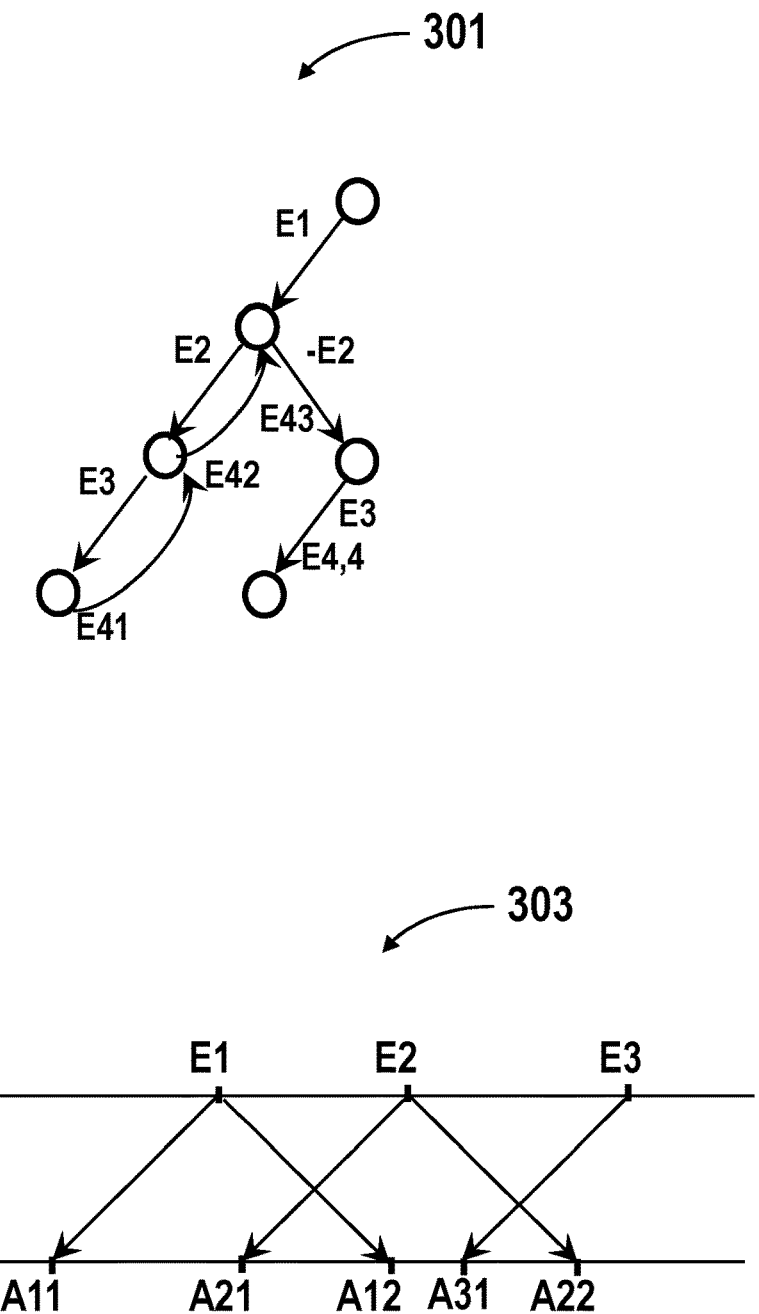
FIG. 3 illustrates examples of rewind and replay implemented as part of the data storage and computational layer of the loan accounting system, according to some embodiments of the present disclosure.

FIG. 3 illustrates examples of rewind and replay implemented as part of the data storage and computational layer of the loan accounting system, according to some embodiments described herein. Event space 301 illustrates a workspace tree that encapsulates potential forward evolutions of a state of a loan. The workspace tree can be the same as the calculation workspace tree as described above. In event space 301, each node may represent a state. E1, E2, E3, etc may each represent an EventHandler which maps an event, current state and the corrected history to actions. In the logical history at t3, loan computations may be performed or the logical history may be updated for events E1, E2, E3; in the logical history at t4, loan computations may be performed or the logical history may be updated for events E1, E3, E4. The physical history may be updated for events E1, E2, E3, −E3, −E2, E3, E4. The coalesced physical history may comprise E1, E2, E3, and E4. Event space 303 illustrates a cascading rewind. The interval defined by A11 and A12 may represents actions related to E1, interval defined by A21 and A22 may represents actions related to E1, A21 may be an action corresponds to start of an interval related to E3. In the rewind algorithm, when an event that affects the logical past is detected, the calculation workspace may rewind to the latest point in the most recent logical history to account for all possible causal influences. In event space 303, A11 may trigger the rewind of E1, and A21 may trigger the rewind of E2.

FIG. 4 illustrates an example method of rewind and replay for the loan accounting platform, according to some embodiments described herein. Rewind and Replay (or "Reversals" functionality) or Reversal Events may be implemented by the loan accounting system. For example, the Rewind and Replay module 206 may be configured to implement the operations described in FIG. 4.

Whereas most Events may represent a new, original fact or data about history, a Reversal can represent a revocation of a previous fact (i.e., Event) and possibly new consequences. Reversals can be broadly categorized into "Corrections" and "Consequential reversals". Corrections may be regarded as the stricter, simpler form of Reversal, and generally may occur only as an exceptional case. For example, Corrections may occur to remedy a bug in the system or an operator error. In some embodiments, Correction Reversals may be represented as a "CorrectionEvent" (i.e., a type of Event) with an appropriate note regarding its cause. The goal of a rewind and replay is to fix the interleaving overlapping causality intervals and calculate the correct updates to insert into the loan's physical history. An example of a Reversal is provided below.

Referring to FIG. 4, in operation 410, a new event (action) may be created and detected to be affecting a logical history. Events may generally occur by the operation of the loan accounting system or may be based on user interaction (e.g., user devices 102). The Events may be created and organized into a data structure as described above. For instance, the action may include a Physical time and a Logical time component. The calculation workspace may rewind to catch causal influences (operation 420). In some cases, the calculation workspace may rewind to the latest point in the most recent logical history to account for all possible causal influences, as described in FIG. 3. Rewinding the workspace may comprise performing cascading retroactive updates due to overlapping causality ranges with another range of actions. Rewind may be performed in a dynamically/iteratively manner such that the logical time of an action is compared with an existing logical time upon every update. Alternatively or in addition to, rewind may handle the updates by storing and union the overlapping intervals in a static manner.

Next, the loan accounting system may be configured to identify a series of relevant events to be replayed (operation 430). The events may be identified using the events and actions data structures as described above. Each of the relevant events may be replayed by recalculating a state of the loan, the logical history may be updated accordingly, and the updates may then be entered into the physical history (operation 440).

Computer Systems

Figure 5:
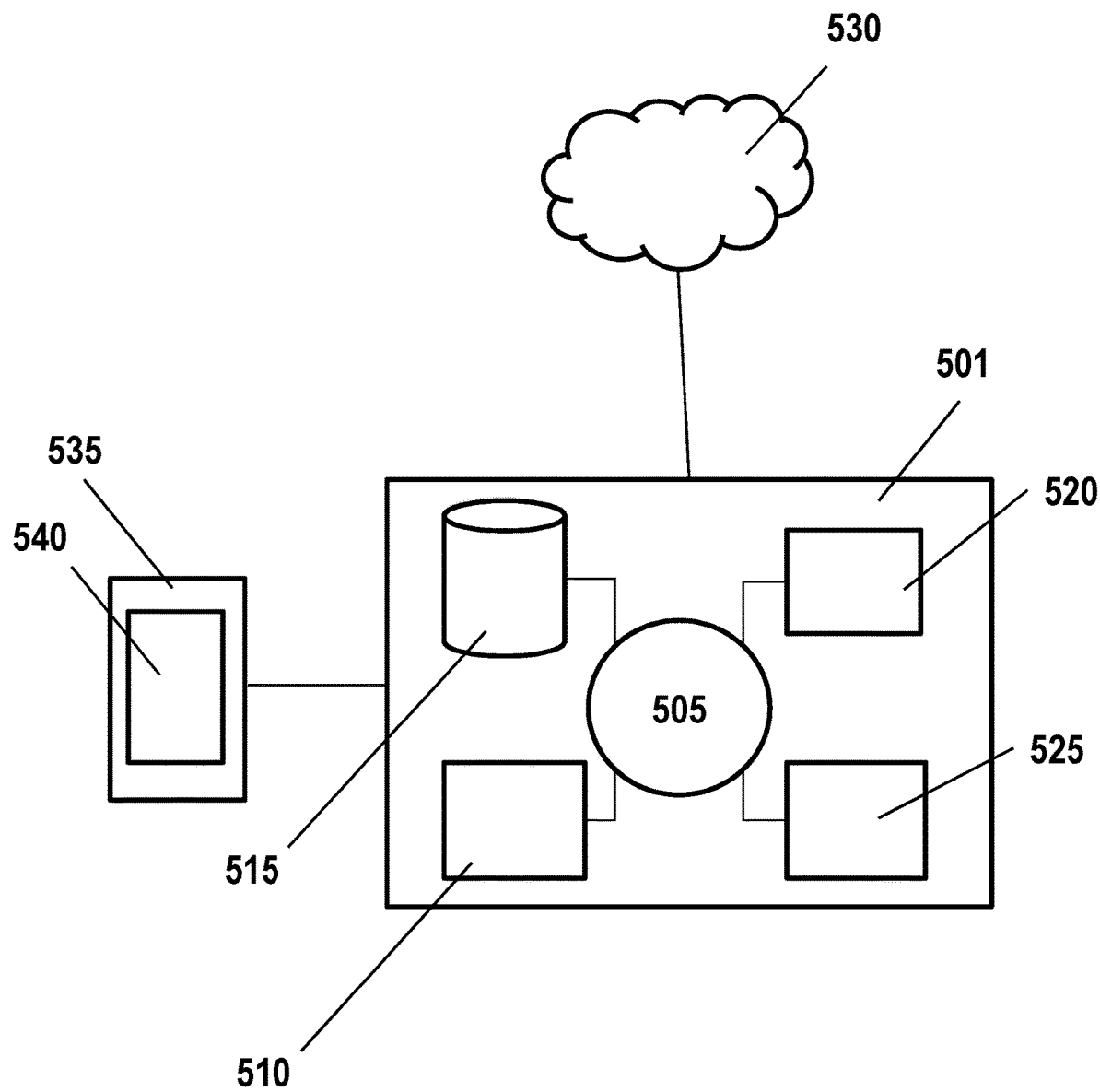
FIG. 5 illustrates an example of computer architecture applicable to any computer system of the present disclosure.

The present disclosure provides computer systems that are programmed to implement methods of the disclosure. FIG. 5 shows a computer system 501 that is programmed or otherwise configured to manage and/or implement a loan accounting system or a distributed state machine and its operations. The computer system 501 can regulate various aspects of FIGS. 1-4 of the present disclosure, such as, for example, the loan accounting system 101, the loan data management module 204, the rewind and replay module 206, the workspace structure in FIG. 3, and the flow chart illustrated in FIG. 4.

The computer system 501 includes a central processing unit (CPU, also "processor" and "computer processor" herein) 505, which can be a single core or multi core processor, or a plurality of processors for parallel processing. The computer system 501 can also include memory or memory location 510 (e.g., random-access memory, read-only memory, flash memory), electronic storage unit 515 (e.g., hard disk), communication interface 520 (e.g., network adapter) for communicating with one or more other systems, and peripheral devices 525, such as cache, other memory, data storage and/or electronic display adapters. The memory 510, storage unit 515, interface 520 and peripheral devices 525 are in communication with the CPU 505 through a communication bus (solid lines), such as a motherboard. The storage unit 515 can be a data storage unit (or data repository) for storing data. The computer system 501 can be operatively coupled to a computer network ("network") 530 with the aid of the communication interface 520. The network 530 can be the Internet, an internet and/or extranet, or an intranet and/or extranet that is in communication with the Internet. The network 530 in some cases is a telecommunication and/or data network. The network 530 can include one or more computer servers, which can enable distributed computing, such as cloud computing. The network 530, in some cases with the aid of the computer system 501, can implement a peer-to-peer network, which may enable devices coupled to the computer system 501 to behave as a client or a server.

The CPU 505 can execute a sequence of machine-readable instructions, which can be embodied in a program or software. The instructions may be stored in a memory location, such as the memory 510. The instructions can be directed to the CPU 505, which can subsequently program or otherwise configure the CPU 505 to implement methods of the present disclosure. Examples of operations performed by the CPU 505 can include fetch, decode, execute, and writeback.

The CPU 505 can be part of a circuit, such as an integrated circuit. One or more other components of the system 501 can be included in the circuit. In some cases, the circuit is an application specific integrated circuit (ASIC).

The storage unit 515 can store files, such as drivers, libraries and saved programs. The storage unit 515 can store user data, e.g., user preferences and user programs. The computer system 501 in some cases can include one or more additional data storage units that are external to the computer system 501, such as located on a remote server that is in communication with the computer system 501 through an intranet or the Internet.

The computer system 501 can communicate with one or more remote computer systems through the network 530. For instance, the computer system 501 can communicate with a remote computer system of a user or a participating platform (e.g., operator). Examples of remote computer systems include personal computers (e.g., portable PC), slate or tablet PC's (e.g., Apple® iPad, Samsung® Galaxy Tab), telephones, Smart phones (e.g., Apple® iPhone, Android-enabled device, Blackberry®), or personal digital assistants. The user can access the computer system 501 via the network 530.

Methods as described herein can be implemented by way of machine (e.g., computer processor) executable code stored on an electronic storage location of the computer system 501, such as, for example, on the memory 510 or electronic storage unit 515. The machine executable or machine readable code can be provided in the form of software. During use, the code can be executed by the processor 505. In some cases, the code can be retrieved from the storage unit 515 and stored on the memory 510 for ready access by the processor 505. In some situations, the electronic storage unit 515 can be precluded, and machine-executable instructions are stored on memory 510.

The code can be pre-compiled and configured for use with a machine having a processer adapted to execute the code, or can be compiled during runtime. The code can be supplied in a programming language that can be selected to enable the code to execute in a pre-compiled or as-compiled fashion.

Aspects of the systems and methods provided herein, such as the computer system 501, can be embodied in programming. Various aspects of the technology may be thought of as "products" or "articles of manufacture" typically in the form of machine (or processor) executable code and/or associated data that is carried on or embodied in a type of machine readable medium. Machine-executable code can be stored on an electronic storage unit, such as memory (e.g., read-only memory, random-access memory, flash memory) or a hard disk. "Storage" type media can include any or all of the tangible memory of the computers, processors or the like, or associated modules thereof, such as various semiconductor memories, tape drives, disk drives and the like, which may provide non-transitory storage at any time for the software programming. All or portions of the software may at times be communicated through the Internet or various other telecommunication networks. Such communications, for example, may enable loading of the software from one computer or processor into another, for example, from a management server or host computer into the computer platform of an application server. Thus, another type of media that may bear the software elements includes optical, electrical and electromagnetic waves, such as used across physical interfaces between local devices, through wired and optical landline networks and over various air-links. The physical elements that carry such waves, such as wired or wireless links, optical links or the like, also may be considered as media bearing the software. As used herein, unless restricted to non-transitory, tangible "storage" media, terms such as computer or machine "readable medium" refer to any medium that participates in providing instructions to a processor for execution.

Hence, a machine readable medium, such as computer-executable code, may take many forms, including but not limited to, a tangible storage medium, a carrier wave medium or physical transmission medium. Non-volatile storage media include, for example, optical or magnetic disks, such as any of the storage devices in any computer(s) or the like, such as may be used to implement the databases, etc. shown in the drawings. Volatile storage media include dynamic memory, such as main memory of such a computer platform. Tangible transmission media include coaxial cables; copper wire and fiber optics, including the wires that comprise a bus within a computer system. Carrier-wave transmission media may take the form of electric or electromagnetic signals, or acoustic or light waves such as those generated during radio frequency (RF) and infrared (IR) data communications. Common forms of computer-readable media therefore include for example: a floppy disk, a flexible disk, hard disk, magnetic tape, any other magnetic medium, a CD-ROM, DVD or DVD-ROM, any other optical medium, punch cards paper tape, any other physical storage medium with patterns of holes, a RAM, a ROM, a PROM and EPROM, a FLASH-EPROM, any other memory chip or cartridge, a carrier wave transporting data or instructions, cables or links transporting such a carrier wave, or any other medium from which a computer may read programming code and/or data. Many of these forms of computer readable media may be involved in carrying one or more sequences of one or more instructions to a processor for execution.

The computer system 501 can include or be in communication with an electronic display 535 that comprises a user interface (UI) 540 for providing, for example, displaying loan related information or user information, for example. Examples of UI's include, without limitation, a graphical user interface (GUI) and web-based user interface.

Methods and systems of the present disclosure can be implemented by way of one or more algorithms. An algorithm can be implemented by way of software upon execution by the central processing unit 505. For example, some embodiments use the algorithm illustrated in FIG. 4 or other algorithms provided in the associated descriptions in FIGS. 1-3.

The provided loan accounting system beneficially allow for efficient computation of a loan. In particular, using the aforementioned rewind and replay model and data structures (e.g., tree structure), the computer system can determine the set of calculations needed based on a recent update to the system. Then, the computer system may reduce memory accesses and/or computation power by performing subsets of the set of calculations that are identified by the computation model to be necessary. The loan accounting computation may be performed in real-time or dynamically in response to an update or input to the system.

Real-time, as used herein, generally refers to a response time of less than 1 second, tenth of a second, hundredth of a second, a millisecond, or less, such as by a computer processor. Real-time can also refer to a simultaneous or substantially simultaneous occurrence of a first event with respect to occurrence of a second event.

Figure 6:
FIG. 6 shows an example of a frontend user interface enabled by the loan accounting system.

FIG. 6 shows an example of a frontend user interface 601, 603 enabled by the loan accounting system. In some cases, upon receiving an update such as a receiving a user input (e.g., change of "Autopay") via the user interface 601, the related loan accounting result may be generated dynamically, and automatically displayed 603 on the user interface.

As used herein, "or" is inclusive and not exclusive, unless expressly indicated otherwise by context. Therefore, "A or B" means "A, B, or both," unless expressly indicated otherwise or indicated otherwise by context. Moreover, "and" is both joint and several, unless expressly indicated otherwise or indicated otherwise by context.

While preferred embodiments of the present invention have been shown and described herein, it will be obvious to those skilled in the art that such embodiments are provided by way of example only. It is not intended that the invention be limited by the specific examples provided within the specification. While the invention has been described with reference to the aforementioned specification, the descriptions and illustrations of the embodiments herein are not meant to be construed in a limiting sense. Numerous variations, changes, and substitutions will now occur to those skilled in the art without departing from the invention. Furthermore, it shall be understood that all aspects of the invention are not limited to the specific depictions, configurations or relative proportions set forth herein which depend upon a variety of conditions and variables. It should be understood that various alternatives to the embodiments of the invention described herein may be employed in practicing the invention. It is therefore contemplated that the invention shall also cover any such alternatives, modifications, variations or equivalents. It is intended that the following claims define the scope of the invention and that methods and structures within the scope of these claims and their equivalents be covered thereby.

What is claimed is:

1. An automated computer-implemented method performed by a system comprising one or more processors and memory storing instructions for regulating a loan managed by a loan accounting system, comprising:

generating, by at least one computer processor of the one or more processors executing computer the instructions stored in the computer memory, a directed acyclic graph (DAG) data structure that models a logical history of the loan managed by the loan accounting system, said logical history comprising a plurality of events of the loan ordered along logical time in which the events have causal influence on one another, wherein edges of the DAG data structure represent respective causally-valid non-reversal events of the loan, and wherein nodes of the DAG data structure represent states of the loan;

receiving, by said at least one computer processor executing computer instructions, an event data structure representing a new event in a loan process of the loan, wherein the event data structure is configured for operation-based updates and comprises a pair (t, u), where t is a side-effect free prepare-update method and u is an effect-update method, and wherein the event data structure comprises an indication of an event type, a physical event time, and a logical event time;

applying, by said at least one computer processor executing computer instructions, one or more inverse operators to traverse the DAG data structure toward a root of the DAG data structure to a latest point in time in the logical history of the loan indicated by the DAG data structure that has no causal dependence on the event data structure, thereby identifying a first series of events related to the logical history of the loan affected by the event data structure;

applying, by said at least one computer processor executing computer instructions, one or more deterministic transformers, based on the event data structure, to calculate a plurality of states of the loan based on a plurality of actions each associated with an event of the first series of events, wherein at least two of the actions have a causal relationship with one another; and automatically updating, by said at least one computer processor executing computer instructions, a physical history of the loan based on the calculated plurality of states, wherein the physical history comprises a second series of events that is different than the first series of events and that is ordered along physical time of actual occurrence.

2. The automated computer-implemented method of claim 1, wherein the event data structure comprises information related to an associated event.

3. The automated computer-implemented method of claim 2, wherein the associated event is stored in a data structure comprising a physical time and an event type.

4. The automated computer-implemented method of claim 1, wherein identifying a first series of events is based on a mapping relationship between a given event of the first series of events and a given action of the plurality of actions.

5. The automated computer-implemented method of claim 1, wherein an action of the plurality of actions has a logical order relationship with another action of the plurality of actions.

6. A system comprising:
at least one computer processor; and
a memory storing computer instructions, wherein the instructions are configured to be executed by the at least one computer processer, to cause the system to perform operations comprising:
generating a directed acyclic graph (DAG) data structure that models a logical history of a loan comprising a plurality of events of the loan ordered along logical time in which the events have causal influence on one another, wherein edges of the DAG data structure represent respective causally-valid non-reversal events of the loan, and wherein nodes of the DAG data structure represent states of the loan;
receiving an event data structure representing a new event in a loan process of the loan, wherein the event data structure is configured for operation-based updates and comprises a pair (t, u), where t is a side-effect free prepare-update method and u is an effect-update method, and wherein the event data structure comprises an indication of an event type, a physical event time, and a logical event time;
applying one or more inverse operators to traverse the DAG data structure toward a root of the DAG data structure to a latest point in time in the logical history of the loan indicated by the DAG data structure that has no causal dependence on the event data structure, thereby identifying a first series of events related to the logical history of the loan affected by the event data structure;
applying one or more deterministic transformers, based on the event data structure, to calculate a plurality of states of the loan based on a plurality of actions each associated with an event of the first series of events, wherein at least two of the actions have a causal relationship with one another; and
automatically updating a physical history of the loan based on the calculated plurality of states, wherein the physical history comprises a second series of events that is different than the first series of events and that is ordered along physical time of actual occurrence.

7. The system of claim 6, wherein the event data structure comprises information related to an associated event.

8. The system of claim 7, wherein the associated event is stored in a data structure comprising a physical time and an event type.

9. The system of claim 6, wherein identifying the first series of events is based on a mapping relationship between a given event of the first series of events and a given action of the plurality of actions.

10. The system of claim 6, wherein an action of the plurality of actions has a logical order relationship with another action of the plurality of actions.

11. A non-transitory computer-readable storage medium storing computer instructions that, when executed by at least one computer processor of a computing system, cause the computing system to perform operations comprising:
generating a directed acyclic graph (DAG) data structure that models a logical history of a loan comprising a plurality of events of the loan ordered along logical time in which the events have causal influence on one another, wherein edges of the DAG data structure represent respective causally-valid non-reversal events of the loan, and wherein nodes of the DAG data structure represent states of the loan;
receiving an event data structure representing a new event in a loan process of the loan, wherein the event data structure is configured for operation-based updates and comprises a pair (t, u), where t is a side-effect free prepare-update method and u is an effect-update method, and wherein the event data structure comprises an indication of an event type, a physical event time, and a logical event time;
applying one or more inverse operators to traverse the DAG data structure toward a root of the DAG data structure to a latest point in time in the logical history of the loan indicated by the DAG data structure that has no causal dependence on the event data structure, thereby identifying a first series of events related to the logical history of the loan affected by the event data structure;
applying one ore more deterministic transformers, based on the event data structure, to calculate a plurality of states of the loan based on a plurality of actions each associated with an event of the first series of events, wherein at least two of the actions have a causal relationship with one another; and
automatically updating a physical history of the loan based on the calculated plurality of states, wherein the physical history comprises a second series of events that is different than the first series of events and that is ordered along physical time of actual occurrence.

12. The non-transitory computer-readable storage medium of claim 11, wherein the event data structure comprises information related to an associated event.

13. The non-transitory computer-readable storage medium of claim 12, wherein the associated event is stored in a data structure comprising a physical time and an event type.

14. The non-transitory computer-readable storage medium of claim 11, wherein identifying a first series of events is based on a mapping relationship between a given event of the first series of events and a given action of the plurality of actions.

15. The non-transitory computer-readable storage medium of claim 11, wherein an action of the plurality of actions has a logical order relationship with another action of the plurality of actions.

* * * * *